US009776894B2

(12) United States Patent
Servida (10) Patent No.: US 9,776,894 B2
(45) Date of Patent: Oct. 3, 2017

(54) APPARATUS FOR PURIFYING A FLUID AND METHOD FOR THE ATTAINMENT THEREOF

(71) Applicant: IDROPAN DELL'ORTO DEPURATORI S.R.L., Milan (IT)

(72) Inventor: Tullio Servida, Milan (IT)

(73) Assignee: IDROPAN DELL'ORTO DEPURATORI S.R.L., Milan (IT)

(*) Notice: Subject to any disclaimer, the term of this patent is extended or adjusted under 35 U.S.C. 154(b) by 121 days.

(21) Appl. No.: 14/979,591

(22) Filed: Dec. 28, 2015

(65) Prior Publication Data
US 2016/0185628 A1    Jun. 30, 2016

(30) Foreign Application Priority Data

Dec. 24, 2014  (IT) .................................. PD14A0365

(51) Int. Cl.
| | | |
|---|---|---|
| *C02F 1/46* | (2006.01) | |
| *C02F 1/469* | (2006.01) | |
| *B01D 61/46* | (2006.01) | |

(52) U.S. Cl.
CPC ............ *C02F 1/4691* (2013.01); *B01D 61/46* (2013.01); *C02F 2201/003* (2013.01); *C02F 2201/004* (2013.01); *C02F 2201/4616* (2013.01)

(58) Field of Classification Search
CPC ............ C02F 1/4691; C02F 2201/4616; C02F 2201/004; C02F 2201/003; B01D 61/46
See application file for complete search history.

(56) References Cited

U.S. PATENT DOCUMENTS

| | | | |
|---|---|---|---|
| 2007/0158185 A1 | 7/2007 | Andelman | |
| 2014/0311960 A1* | 10/2014 | Xia | ........................ C02F 1/463 210/202 |

FOREIGN PATENT DOCUMENTS

| | | |
|---|---|---|
| GB | 991468 | 5/1965 |
| WO | 2011072400 | 6/2011 |

* cited by examiner

*Primary Examiner* — Arun S Phasge
(74) *Attorney, Agent, or Firm* — Mark M. Friedman (57) ABSTRACT

Apparatus for purifying a fluid, which comprises electrode layers facing each other, power supplied to different polarities with spacer layers interposed, and traversed by a flow of fluid to be treated containing ionized particles. The electrode layers and the spacer layers are wound as a spiral around a longitudinal extension axis inside the suitably cylindrical containment structure. The power supply comprises a pair of collectors that are extended with portions inside the winding connected to the corresponding first internal sides of the electrode layers at the longitudinal extension axis.

16 Claims, 4 Drawing Sheets

APPARATUS FOR PURIFYING A FLUID AND METHOD FOR THE ATTAINMENT THEREOF

FIELD OF APPLICATION

The present invention regards an apparatus for purifying a fluid and a method for the attainment thereof, according to the preamble of the respective independent claims.

More in detail, the present apparatus is of the type with flow-through capacitors and it is intended to be advantageously employed for removing from fluids, and more particularly usually from liquids, undesired concentrations of contaminants, e.g. constituted by salts dissolved at their interior.

The present apparatus can also be employed for concentrating within fluids, particularly of industrial processes, ionized particles in order to facilitate the recovery or disposal thereof.

The apparatus, according to the present invention, is therefore advantageously employable in industrial and civil fields, for example for the desalination of sea water, for the softening of particularly hard waters, for the removal, from water, of salts (such as chlorides and sulfates), nitrates, nitrites, ammonia, heavy metals, organic substances of micro-pollutants in general, or for the deionization of fluids, for example of industrial processes, or for the concentration of pollutant substances that are difficult to dispose of or advantageous to recover for a reuse.

The present invention is therefore generally inserted in the industrial field of the production of apparatuses and of components of apparatuses for treating, filtering and purifying fluids.

STATE OF THE ART

The apparatuses for purifying fluids by means of flow-through capacitors conventionally comprise a containment structure, usually made of plastic, housing at its interior a plurality of capacitors formed by superimposed electrodes, separated from each other by spacer layers, in which the fluid flow to be treated flows.

More in detail, the flow of fluid to be treated is made to pass between the electrodes, in order to obtain, in accordance with the applications, the concentration of a solute with ionized particles, i.e. a solvent from which such particles have been removed (whether these are ions, or other charged substances in accordance with the specific application).

The electrodes of the flow-through capacitors are formed with conductor material layers facing each other and charged to opposite polarities by a direct current power supply in order to generate an electrostatic field between the contiguous electrodes.

During a provided operating step of the apparatus, the fluid flows between the electrodes with different polarity and the charged particles present in the fluid, for example ions of dissolved salts, are attracted by the electrodes and retained thereon by the action of the electric field.

In a step of regeneration of the apparatus, following the operating step, the electric field is removed and the ions, which have accumulated on the electrodes, are removed by means of the use of a discharge flow.

The operation of such apparatuses therefore provides for the alternation of operating steps, in which the charged solutes are concentrated at the opposite electrodes, and regeneration steps, in which the solutes accumulated on the electrodes are removed by means of the aforesaid discharge flow.

The electrodes of the flow-through capacitors electrostatically absorb and release the contaminants of ion charges and actively participate in the process of deionization of the liquid to be treated.

The removal of the solutes by means of the apparatuses with flow-through capacitors does not substantially involve oxidation-reduction reactions and the passage of current between the electrodes is mainly due to the transfer of charge following the contact of the ions with the electrodes under the action of the field.

The electrodes are for such purpose formed by porous structures of conductor materials. Numerous materials are known that can be employed for attaining the electrodes, such as spongy active carbon in the form of sheets or fibers, as described for example in the U.S. Pat. No. 6,413,409, or sheets of a mixture comprising PTFE, as described for example in the U.S. Pat. No. 6,413,409.

Such porous structures allow considerably increasing the electric charge exchange surface area, and are often associated with graphite layers adapted to make the electrical connection with the power supply and to confer improved mechanical characteristics of flexibility to the electrode itself.

Each apparatus electrically behaves as a capacitor with considerable capacity.

The layers with alternated polarity of electrodes are separated from each other due to the spacer layers, in which, as stated, the fluid flow to be treated flows. Such spacer layers are made of a non-conductive and porous material, such as a nylon fabric.

In order to increase the performances of the cells with flow-through capacitors, the surfaces of the conductor layers of the electrodes can be associated with permeable or semi-permeable material layers, capable of selectively trapping the ions which migrate towards the corresponding electrode under the action of the field, selectively attaining membranes of anionic exchange type or of cationic exchange type. The ions are thus retained or trapped in the layer of such material close to the electrode, towards which they migrate, given that they are no longer subjected to the vortical action of the fluid. The use of these materials has allowed improving the efficiency of the flow capacitors, allowing the retention and concentration on the electrodes of a greater quantity of ions, and more generally of charged contaminants.

Two different configurations of apparatuses with flow-through capacitors are generally known. A first configuration, which is for example described in the U.S. Pat. No. 6,628,505, U.S. Pat. No. 8,002,963, WO 2001009907, EP 861114, WO1994026669 provides for a containment structure of parallelepiped shape in which stacked and separate layers of electrodes are housed, separately power supplied, with the spacer layers interposed therebetween.

Such containment structure is connected to a lateral feed duct which allows feeding the spacers around the stack of layers, and to an extraction duct which is placed at the center of the stack of layers, orthogonally thereto and starting from a central hole.

In practice, such embodiment configuration has proven to be rather difficult to make, at least in the embodiments of the abovementioned patents, and its efficiency is not high due to the considerable volume of liquid that must be accumulated with each cycle around the layers such as the supply collector of the spacer layers.

A second configuration provides for winding the electrode layers as a spiral starting from a central core, with possibly the ion-selective semi-permeable layers associated therewith and with the spacer layers interposed. The winding of superimposed layers is housed in a circular containment structure which can be power supplied at one end thereof by making the flow longitudinally flow between the layers until it is picked up at the opposite longitudinal end, or it can be fed to one end or laterally with the extraction of the flow from the central core, which in this case will be made for example with a perforated hollow tube.

Also in this configuration, a succession of superimposed layers is radially obtained, even if in reality the layers departing from the central core can be at most only one per type in order to form an elementary cell. Advantageously, several electrode layers usually depart from the central core; once wound as a spiral, such electrode layers come to make a plurality of radial superimpositions.

Flow-through capacitors of the above-indicated known type, i.e. with wound spiral, are for example described in the patents WO 9313844, U.S. Pat. No. 5,200,068, U.S. Pat. No. 5,779,891, U.S. Pat. No. 5,192,432 and U.S. Pat. No. 5,748,437.

Such embodiment configuration of an apparatus with flow-through capacitors, while being of simpler production due to the formation of the layers via simple winding on a central core, has in practice proven to have a considerable drawback.

The electrical connectors of the power supply to the electrode layers, for this type of apparatus with wound spiral, are obtained with projections that are superimposed for electrodes of the same polarity. Such superimposed projections, with size necessarily limited in order to be extended outside the containment structure, limit the intensities of the current flow, thus determining a considerable limitation in the size of the area of the electrode layers. Limited size of the projections and their superimposition therefore determines the drawback of limiting the maximum supply current of the apparatus.

The patent WO 2011/072400 describes an apparatus of known type for purifying a fluid, which comprises pairs of electrodes and of spacer layers alternated with each other and wound around a longitudinal axis of the apparatus in a manner such to form a spiral-like winding. In addition, the apparatus comprises a pair of collectors, each of which constituted by a metallic mesh embedded in the corresponding electrode and wound as a spiral around the longitudinal axis together with the electrode itself.

In operation, the apparatus of known type described in the patent WO 2011/072400 is fed with a flow of fluid transverse to the longitudinal axis of the apparatus, which orthogonally traverses the electrodes and the collectors, in particular coming into contact with the collectors themselves.

The apparatus of known type described in the patent WO 2011/072400 is structurally complex and complicated to attain, in particular requiring the use of collectors with mesh form embedded within the corresponding electrodes.

PRESENTATION OF THE INVENTION

In this situation, the problem underlying the present invention is therefore that of eliminating the drawbacks of the abovementioned prior art, by providing an apparatus for purifying a fluid which allows power supplying electrodes of spiral type wound with an improved distribution of current and with a greater current intensity.

Another object of the present invention is to provide an apparatus for purifying a fluid which allows the use of wound spiral electrodes of large size.

Another object of the present invention is to provide an apparatus for purifying a fluid and method for the attainment thereof, which has a high efficiency.

Another object of the present invention is to provide an apparatus for purifying a fluid which is simple and inexpensive to attain and entirely reliable in operation.

Another object of the present invention is to provide a method for attaining an apparatus for purifying a fluid with wound spiral that is simple and inexpensive to attain.

BRIEF DESCRIPTION OF THE DRAWINGS

The technical characteristics of the finding, according to the aforesaid objects, can be clearly seen in the contents of the below-reported claims and the advantages thereof are more evident in the following detailed description, made with reference to the enclosed drawings, which represent several merely exemplifying and non-limiting embodiments of the invention, in which:

DETAILED DESCRIPTION OF A PREFERRED EMBODIMENT

Figure 1:
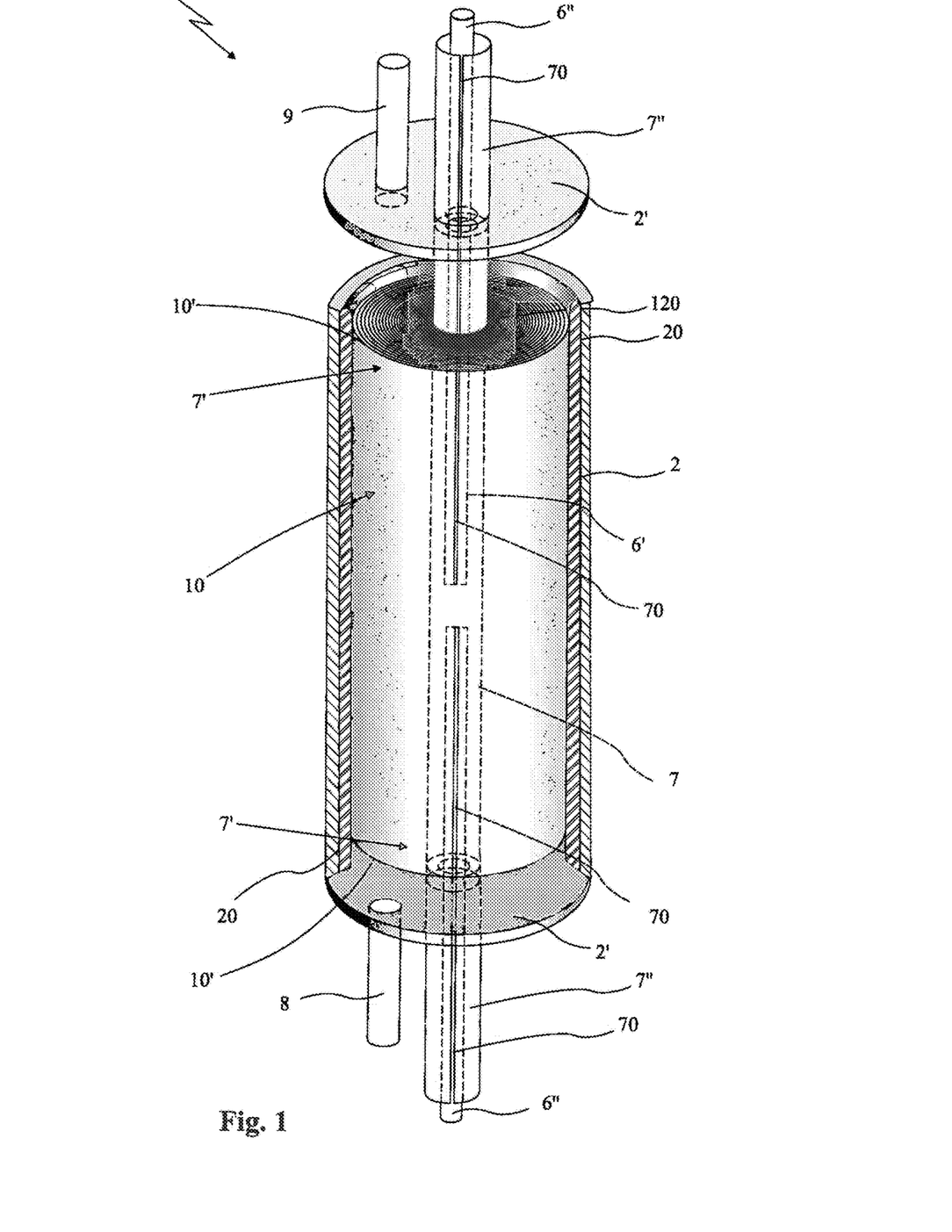
FIG. 1 schematically shows a perspective view of the apparatus for purifying a fluid, object of the present invention.
Figure 2:
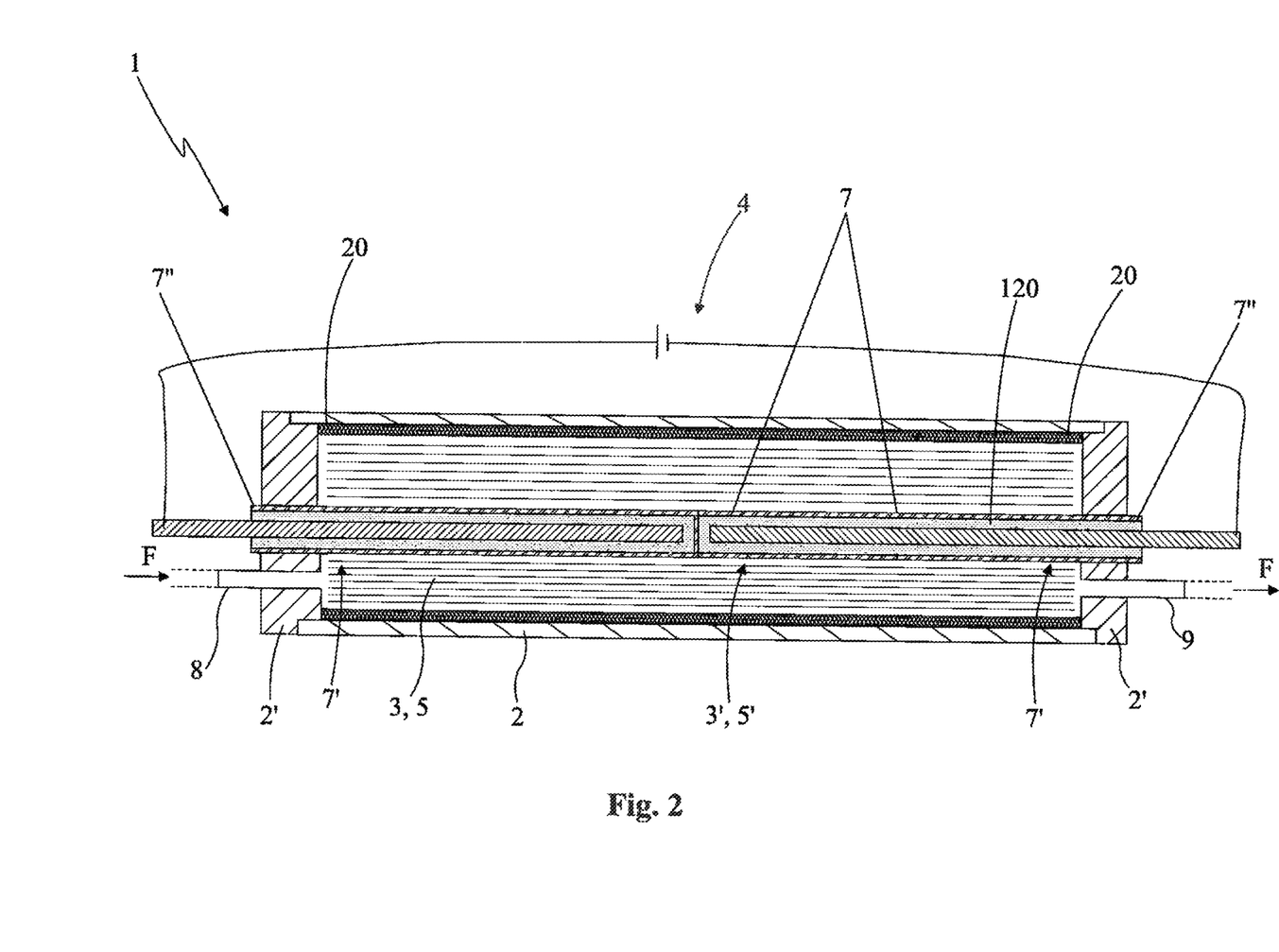
FIG. 2 shows a longitudinal section view of the apparatus of FIG. 1.
Figure 3:
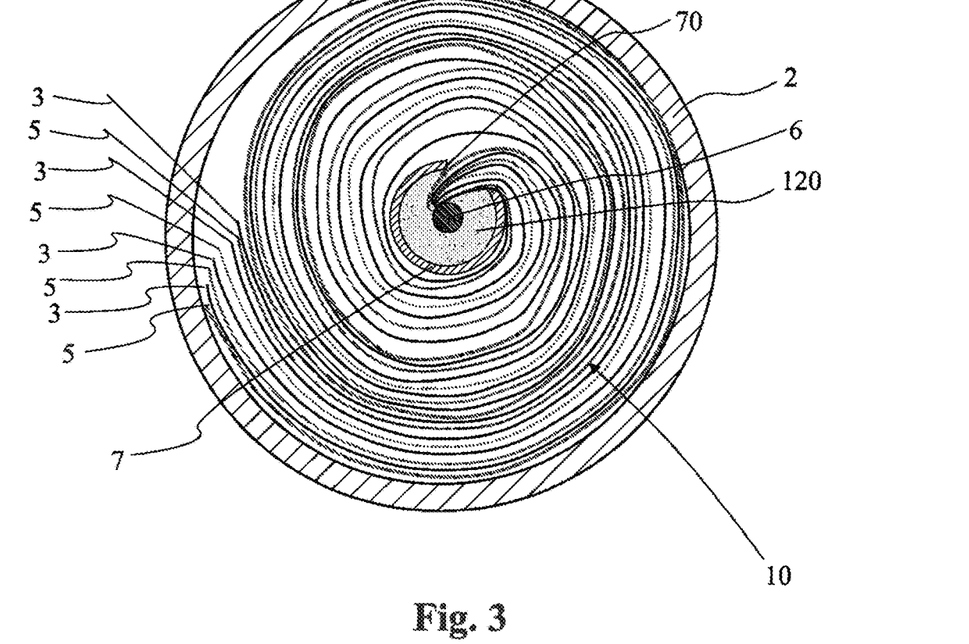
FIG. 3 schematically shows a cross section view of the apparatus of FIG. 1.
Figure 4:
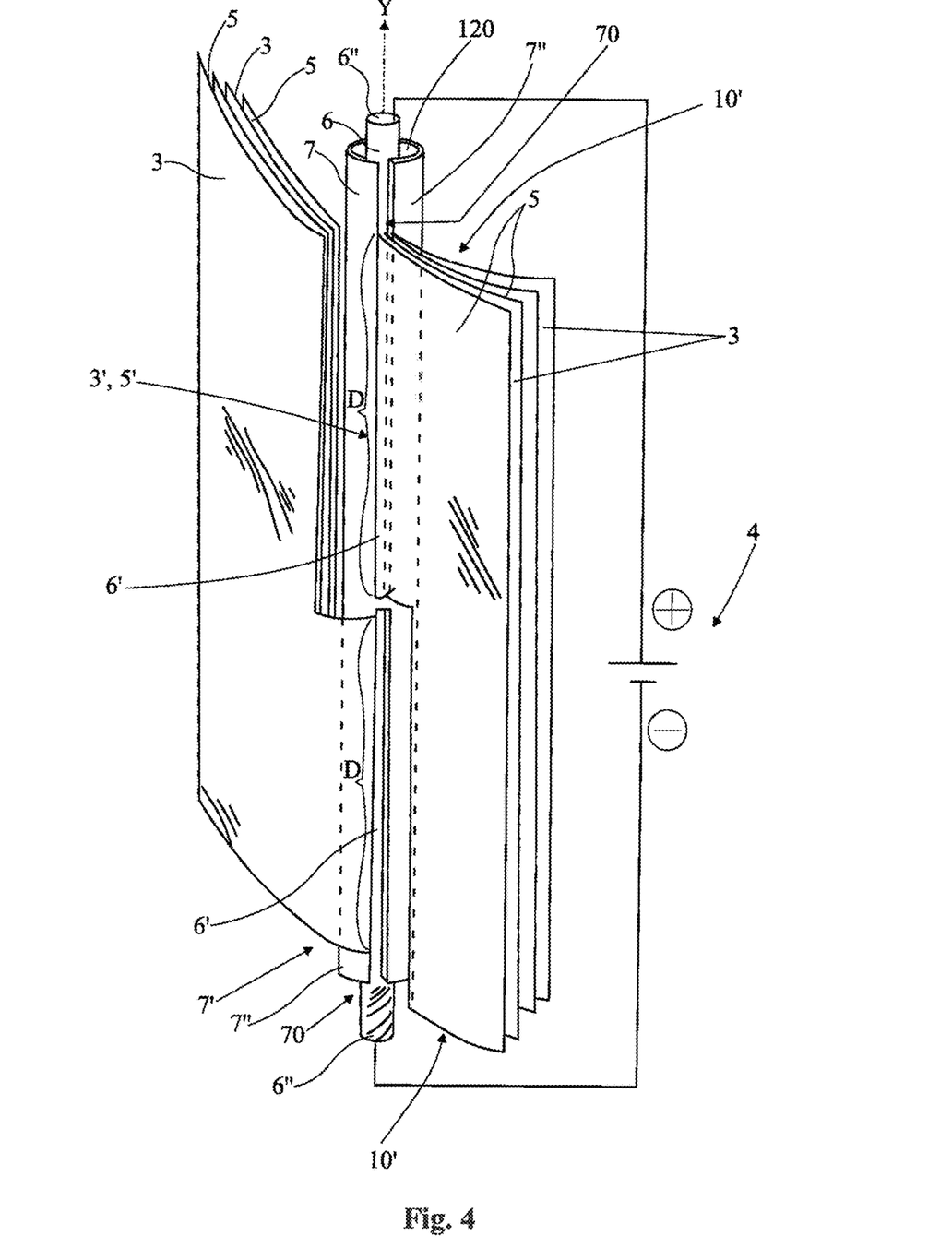
FIG. 4 shows a detail of the apparatus of FIG. 1 relative to a tubular-shaped central core with two collectors inserted for the electrical connection with non-wound electrode layers that are illustrated in partial view.
Figure 5:
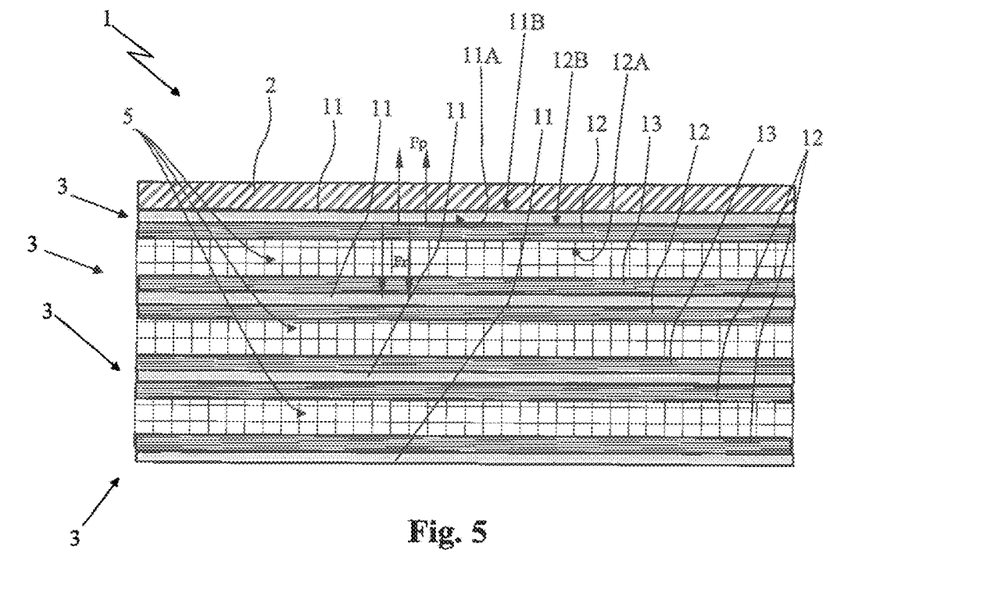
FIG. 5 schematically shows an enlarged view of the section of FIG. 1.

With reference to the enclosed drawings, reference number 1 overall indicates an apparatus for treating a fluid containing ionized particles, object of the present invention. Hereinbelow, the term ionized particles will generally indicate any contaminant dissolved in the fluid to be treated capable of being attracted by an electrostatic field, such as in particular the ions dissolved in a solution or also other polarized contaminants such as organic substances or micro-pollutants in general.

The apparatus 1 is therefore adapted to be employed for the deionization of fluids containing ionized particles in apparatuses for civil use or in plants or processes of industrial type; in particular it can be employed for the deionization of water, such as for example for the desalination of sea water, being advantageously able to remove, from its interior, salts in solution (such as chlorides and sulfates), nitrates, nitrites, ammonia, and other polarized contaminants of organic substances or micro-pollutants in general.

The apparatus 1 comprises a containment structure 2 with advantageously substantially cylindrical shape. The cylindrical shape is functional, as shown hereinbelow, in order to contain a spiral-like winding of electrodes which makes, due to the winding, a counter-shaped form; the winding is also substantially cylindrical, with diameter slightly less than that inside the containment structure in order to allow its insertion therein. Of course, without departing from the protective scope of the present invention, the cylindrical shape can be substituted with other forms capable of containing the aforesaid winding.

The apparatus 1 comprises at least one pair of electrode layers 3 facing each other, power supplied to different polarities by an electric power supply 4. The electrical power supply will therefore be direct or obtained with moderately direct pulsed current.

The electrode layers 3 have a plate-like extension, i.e. they are provided with a thickness much lower than the extension of the planar surface, which as indicated hereinbelow is intended to form a wound spiral.

Two or more electrically isolating spacer layers 5 are also provided, interposed between the electrode layers, and susceptible of being traversed by a flow of fluid to be treated F containing the ionized particles.

The latter exerts a hydraulic pressure on the two opposite wet surfaces of the electrode layers 3, which is transmitted onto the outermost layers and is in the end balanced by the containment structure 2.

The electrode layers 3 of the aforesaid pair of layers and the spacer layers 5 are wound, respectively starting from their first and second internal sides 3', 5', so as to make a spiral-like winding 10 around a longitudinal extension axis Y within the containment structure 2.

In accordance with the idea underlying the present invention, the electric power supply 4 comprises at least one pair of electrical connection collectors 6 with different polarity, which are extended for at least one internal portion 6' thereof (arranged inside the containment structure 2), in a manner substantially parallel to the longitudinal extension axis Y and are connected to the respective electrode layers 3 at their first internal side 3' i.e. at the longitudinal extension axis Y.

The internal portion 6' of each collector 6 is longitudinally extended with elongated shape according to an extension direction parallel to the longitudinal extension axis Y; in addition, the electrode layers 3 are wound as a spiral around the corresponding internal portions 6' of the collectors 6.

In particular, the spacer layers 5 are wound, together with the electrode layers 3, around the internal portions 6' of the collectors 6.

Preferably, the electrode layers 3 and the spacer layers 5 are wound around the internal portions 6' of both the electrodes 6.

Advantageously, the internal portion 6' of each collector 6 has rod-like shape, and in particular each entire collector 6 has rod-like shape.

Preferably, the internal portion 6' of each collector 6 is axially aligned with the longitudinal extension axis Y.

Suitably, the internal portions 6' of the collectors 6 are connected to the corresponding electrode layers 3 only at the corresponding first internal sides 3' of the electrode layers 3 themselves.

Advantageously, the internal portions 6' of the collectors 6 are arranged at the center of the spiral-like winding 10.

Preferably, each electrode layer 3 is extended starting from its first internal side 3' (defined in particular from a lateral edge of the electrode layer 3 itself) connected to the internal portion 6' of the corresponding collector 6, being wound around the internal portion 6' itself according to the aforesaid spiral-like winding 10.

Advantageously, the first internal sides 3' of the electrode layers 3 are connected to the internal portion 6' of the corresponding collector 6 along a line of connection parallel to the longitudinal extension axis Y.

In particular, the aforesaid line of connection between the first internal side 3' of each electrode layer 3 and the internal portion 6' of the corresponding collector 6 is defined on the external surface of the internal portion 6' itself.

Preferably, the collectors 6 and the electrode layers 3 are arranged in a manner such that each electrode layer 3 receives the electric current, coming from the internal portion 6' of the corresponding collector 6, starting from the first internal side 3' of the electrode layer 3 itself, and in particular starting from the line of connection between the first internal side 3' and the internal portion 6' of the corresponding collector 6.

Advantageously, the two collectors 6 are isolated from each other, i.e. they are not placed in direct electrical communication by the fluid to be treated F1. The man skilled in the art is of course quite capable of achieving the electrical isolation of the collectors 6 with different execution modes.

For example, a tubular body 7 can be advantageously provided that is arranged substantially coaxial with the longitudinal extension axis Y, at whose interior the electric connection collectors 6 are at least partially housed. The latter are also preferably inserted with their internal portions 6' for longitudinal extensions D that are not superimposed, engaging two different parts of the tubular body 7, in particular starting from opposite internal ends 7' (inside the containment body 2) of the tubular body 7 itself.

Otherwise, the collectors 6 can also be extended with superimposed internal sections, isolating elements being provided therebetween that are obtainable for example by means of a partition of the tubular body 7, obtainable with a longitudinal separator septum.

Preferably, moreover, the internal portions 6' of the electric connection collectors 6 are electrically connected to the first internal sides 3' of the electrode layers 3. More clearly, the internal portions 6' are connected for their longitudinal extension D to the facing sections of the first internal sides 3' of the corresponding electrode layers 3, starting from opposite longitudinal ends 10' of the spiral-like winding 10.

The electric connection collectors 6 are embedded with their internal portion 6' within the tubular body 7 in a liquid-proofing resin 120.

The tubular body 7 as depicted in the enclosed figures is sealingly extended through the covers 2' and preferably for a section 7" outside the containment body 2, with size underlined in the schematic drawing of the enclosed figures.

The electric connection collectors 6 are also provided with an external portion 6", which is extended beyond the spiral-like winding 10, so as to exit from the containment body 2 in order to be connected to the power supply 4.

The tubular body 7 is also advantageously provided with two longitudinal grooves 70, through which the internal portions 6' of the electric connection collectors 6 are electrically connected to the facing sections of the first internal sides 3' of the electrode layers 3.

The abovementioned cylindrical containment structure 2 is closed at its longitudinal ends by a first and second end cover 2'. The latter are respectively connected to a feed duct 8 for feeding the liquid to be treated and to an extraction duct 9 for extracting the treated liquid. In order for the liquid to longitudinally pass through the separator layers 5 interposed between the electrode layers 3, seal elements 20 are provided between the external surface of the spiral-like winding 10 and the internal surface of the containment structure 2 at the longitudinal ends of the spiral-like winding 10 itself.

The ends of the tubular body 7 will advantageously be mechanically connected to the covers 2' in order to bring the external portions 6" of the electrical collectors 6 outside the containment structure 2.

The spiral-like winding 10 can be obtained starting from more than two pairs of electrode layers 3 with the respective spacer layers 5, taking care to connect all the electrode layers 3 of a same polarity to the same collector 6 and to maintain isolated the electrical connections between the first internal sides 3' of the electrode layers 3 and the internal portions 6' of the collectors 6 with different polarities, for example by arranging collectors 6 that are longitudinally not superimposed, inserted in the opposite terminal sections of the tubular body 7 and connected through separate grooves to the first internal sides 3' of the electrode layers 3. According to one advantageous characteristic of the present invention, each electrode layer 3 of the at least one provided pair of layers comprises at least one metallic conduction layer 11, electrically connected to the power supply 4 and provided with at least one first contact surface 11A, and at least one first graphite layer provided with first wet surface 12A directed towards the spacer layer 5 and with a first dry surface 12B compressed by the hydraulic pressure exerted by the fluid F, directly in adherence against the first contact surface 11A of the metallic layer 11 in order to distribute the current of the power supply 4 from the first metallic conduction layer 11 to the first graphite layer 12.

In such a manner, the metallic conduction layer 11 is electrically coupled to the first graphite layer 12 due to the hydraulic pressure exerted by the fluid which, by flowing between the electrode layers 3, compresses the same first graphite layer 12 against the metallic conduction layer 11.

The electrical contact between the metallic conduction layer 11 and the first graphite layer 12 occurs due to the same pressure provided by the fluid in the passage chamber, without requiring complex coupling operations between layers during production.

For greater clarity, in the figures Fp indicates the pressure force exerted by the impermeable graphite layer 12 on the metallic conduction layer 11, and Fr indicates the reaction force of the metallic conduction layer 11, which will be due to a reaction of the containment structure 2 or, as explained hereinbelow, to the pressure force of a second graphite layer 13 pressing against the metallic conduction layer 11 on the contact surface 11B of the latter.

The apparatus for treating fluids is configured with a plurality of pairs of electrode layers 3 arranged in succession along a radial direction Z of the winding 10 and substantially orthogonal to the single electrode and separator layers 3, 5, which are retained in position by the external containment structure 2.

More in detail, the electrode layers 3 with spiral progression extend in the direction Z considered in radial sense, a repetition in succession of the electrode layers 3 even if there is only one pair of electrode layers 3 at the start.

The spacer layers 5 are as stated interposed between the electrode layers 3. Such spacer layers 5 can in turn be constituted by highly porous non-conductive materials or by plastic meshes, capable of isolating the electrodes, allowing the passage of the fluid flow, such as a porous synthetic material or other non-conductive spacer materials such as glass fiber or nylon fabric. Advantageously, the metallic conduction layer 11 of each electrode layer 3 is provided with a second contact surface 11B oriented in a direction opposite the first contact surface 11A, and each electrode layer 3 comprises at least also a second graphite layer 13 provided with a second wet surface 13A directed towards a separator layer 5 contiguous with that towards which the first wet surface 12A of the first graphite layer 12 is directed, and with a second dry surface 13B compressed by the hydraulic pressure directly in adherence against the second contact surface 11B of the metallic conduction layer 11 in order to distribute the current of the power supply from the metallic conduction layer 11 to the second graphite layer 13.

Advantageously, the metallic conduction layer 11 of each electrode layer 3 is compressed at its opposite first and second contact surface 11A, 11B, in a balanced manner due to the opposite pressures exerted by the first and second dry surfaces 12B, 13B of the two graphite layers 12, 13.

In each case, i.e. both in the case of electrodes 3 comprising a single graphite layer 12, and in the case of electrodes comprising a double graphite layer 12, 13, the pressure exerted by the fluid (or by the fluids) on the electrodes 3 and which passes through the spacer layer 5 or the plurality of spacer layers 5 is balanced by the reaction exerted by the containment structure 2. In the case of a plurality of electrode layers 3, each comprising two graphite layers 12, 13 with a metallic conduction layer 11 interposed, the pressure of the fluid on the metallic conduction layers 11 of the intermediate electrodes is balanced by the opposing actions of the hydraulic pressure exerted thereon through the opposing graphite layers 12, 13 while the pressures at the ends of the succession of electrode layers 3 are balanced by the containment structure 2.

If two end electrodes are not provided at the ends of the succession of electrodes 3, but rather two walls are provided delimiting two terminal fluid F passage spacer layers 5, then in this case the same spacer layers 5 with their fluid and the wall of the containment body 2 will act as retention elements in order to balance the pressures.

The spacer layers 5 are for example constituted by highly porous non-conductive materials.

The containment structure 2 can be obtained with a plastic body, capable of retaining the at least one pair of electrodes and advantageously the succession of electrodes 3 compacted together.

The apparatus configuration with a plurality of electrodes 3 in succession can be attained with an extremely simple production process and with extremely limited costs, and simultaneously it allows conveying high current to the facing electrodes, without requiring the limitation of the maximum surface area of the electrodes. Indeed, the power supply is connected to the collectors 6 which in turn are connected to the superimposed terminals of a plurality of metallic conduction layers 11 of the electrode layers 3, without the limitations of conductivity of the projections and of the graphite limiting the maximum applicable current.

As is known, graphite offers optimal characteristics of resistance to corrosive agents and more generally oxidizing agents, and hence the graphite layers 12, 13 are susceptible of coming into contact with the fluid to be treated without particular drawbacks. Otherwise, the metallic conduction layer 11, e.g. advantageously made of aluminum, is susceptible of oxidation and corrosion and hence of deterioration of its mechanical and electrical properties over time, and therefore it is necessary to protect it from contact with the fluid (or with fluids) to be treated. For such purpose, advantageously, each graphite layer 12, 13 and the opposite metallic conduction layer 11 of each electrode layer 3 can be experimentally sealed together by provided sealing elements, in order to prevent the fluid from penetrating in contact with the surfaces of the metallic conduction layer 11.

Such sealing elements can for example comprise a perimeter cord of glue, or a perimeter deformation (e.g. a bend) which engages the graphite layer (or the two graphite layers 12, 13) with the opposite metallic conduction layer 11.

In the preferable and more frequent case in which each electrode 3 comprises two graphite layers 12, 13 with the metallic conduction layer 11 interposed, then the same electrode will be substantially made in the form of a bag with the first and the second graphite layer 12, 13 defining a closed envelope containing the metallic conduction layer 11.

Each graphite layer 12, 13 of each electrode 3 can be, in accordance with the specific embodiment of an apparatus with flow-through capacitors, directly in contact with the fluid with its wet surface 12A, 13A, or advantageously coated by a layer for example of spongy carbon in order to increase the wet surface area and better trap the charged particles. Furthermore, each layer of graphite 12, 13, alternatively or in addition to the coating of the carbon layer, can also have an ion-selective membrane.

In the embodiment illustrated in the enclosed figures, the apparatus is intended for the purification of a fluid and for such purpose comprises a flow-through capacitor formed, in a per se known manner, by a plurality of electrode layers 3 electrically connected, by means of the collectors 6, to a direct current DC power supply. The latter charges the contiguous electrode layers 3 to different polarities in a manner so as to define a plurality of pairs of facing electrodes which form the armatures of the same number of capacitors in series with each other, between which the electric fields are established.

The operating cycle of the apparatus in this case provides for, in a per se conventional manner and well-known to the man skilled in the art, a charging step, in which the power supply charges the contiguous electrodes 3 to different polarities in order to bring them to an operating voltage, equal for example to 1.6 V. For such purpose, the power supply supplies current to the metal conduction layers 11, which distribute it to the graphite layers 12, 13.

The cycle then provides for an operating step, in which, with the electrodes 3 charged, the flow of fluid to be treated is forced to pass through the capacitor, by means of the feed duct and the extraction duct. During such operating step, the polarized particles are removed from the fluid due to the fact that the ionized particles are attracted by the electrodes 3 with polarity opposite thereto, determining a progressive accumulation of the same ionized particles on the same electrodes 3.

Once the programmed saturation of the electrodes 3 with the polarized particles present in the fluid has been reached, the cycle provides for a step of regeneration, in which with the electrodes 3 deactivated, a flow of discharge fluid, preferably containing a solubilizing product, is forced to pass into the capacitor with consequent removal of the ionized particles accumulated on the electrodes 3.

The electrode layers 3 are charged for example to a voltage of 1.6 Volt and provide that the graphite layers 12, 13 are coated on their first and second wet surface 12A, 13A with a material with porous structure, such as (as mentioned above) active carbon, or having a spongy formation with surface interstitial pores which offer a considerable exchange surface area with the liquid. Each graphite coating 12, 13 can be constituted by any one of the materials described for example in the U.S. Pat. No. 6,413,409 enclosed herein for reference from line 64 of column 3 to line 41 of column 4, or by flexible conductive sheets of PTFE and carbon particles as described in the U.S. Pat. No. 7,175,783 enclosed herein for reference, or by any material described in the U.S. Pat. No. 6,709,560, enclosed herein for reference, from line 26 of column 6 to line 23 of column 7.

The electrode layers 3 can also comprise, as mentioned above, a layer of semi-permeable ion exchange material, which can be associated in various ways to the first wet surface 12A, 13A of the graphite layers 12, 13 or preferably to the surface of the active carbon layer. It can also be separated by means of a spacer from the surface of the active carbon or of the graphite layer 12, 13 directly.

The semi-permeable material layer is adapted to selectively trap the ions that migrate towards the electrodes 3 under the action of the field, during an operating step better specified hereinbelow, allowing the improvement of the capacitor performances, i.e. retaining, in the aforesaid operating step, a greater quantity of charged particles. The latter are then at least partly released by the electrodes 3 during the subsequent regeneration step, in particular passing through provided holes made in the semi-permeable material layer.

Also forming an object of the present invention is a method for producing an apparatus for purifying a fluid of the above-described type, for which the same reference numbers and nomenclature will be maintained. Hereinbelow, for description simplicity reference will be made to the same nomenclature introduced up to now, even if it must be understood that the present method can be obtained in order to make apparatuses that are even different from that considered above.

The aforesaid method provides for the following operative steps:

a step of electrical connection of the internal portions 6' of the electric connection collectors 6 to the respective electrode layers 3 at their first longitudinal internal side 3';

a step of isolating the electrical collectors 6 in order to liquid-proof them with respect to the fluid;

a step of winding the at least one pair of electrode layers 3 and spacer layers 5 around the internal portions 6' of the collectors 6, with spiral-like winding starting from their internal longitudinal side;

a step of inserting the spiral-like winding 10 thus obtained within the cylindrical containment structure 2.

Advantageously, in the aforesaid step of electrical connection, the internal portions 6' of the collectors 6 are connected to the respective electrode layers 3 only at the first longitudinal internal side 3' of the electrode layers 3.

Advantageously, the isolating step provides for a step of introducing the internal portions 6' of the electric connection collectors 6 within the tubular body 7 with each polarity introduced starting from a longitudinal end of the tubular body 7 and with the connection to the first longitudinal internal sides 3' of the electrode layers 3 arranged through the longitudinal grooves 70.

A step of introducing a resin 120 within the tubular body 7 is therefore preferably provided, in order to isolate the electrical collectors 6.

The apparatus and the method thus conceived therefore attain the pre-established objects.

The invention claimed is:

1. An apparatus for purifying a fluid, the apparatus comprising:
   a containment structure;
   at least one pair of electrode layers facing each other and provided with corresponding first internal sides;
   an electric power supply configured to power supply to different polarities the electrode layers of the at least one pair of electrode layers;
   two or more electrically isolating spacer layers, interposed between the electrode layers, provided with corresponding second internal sides, and configured to be traversed by a flow of fluid to be treated containing ionized particles, wherein the at least one pair of electrode layers and the spacer layers are wound, respectively starting from their first and second internal sides and with spiral-like winding, around a longitudinal extension axis inside the containment structure, the power supply comprising at least one pair of collectors for electric connection with different polarity, wherein each of the collectors is extended with a corresponding internal portion arranged inside the containment structure and is extended with an external portion arranged outside the containment structure, the internal portions of the collectors being parallel to the longitudinal extension axis and being connected to the corresponding first internal sides of the electrode layers of the at least one pair of electrode layers at the longitudinal extension axis, the internal portion of each collector being longitudinally extended with elongated shape according to an extension direction parallel to the longitudinal extension axis, the electrode layers being wound as a spiral around the corresponding internal portions of the collectors.

2. The apparatus for purifying a fluid according to claim 1, the apparatus comprising a tubular body which is arranged coaxial with the longitudinal extension axis and contains the collectors at the interior of the tubular body itself.

3. The apparatus for purifying a fluid according to claim 1, wherein the collectors are extended with the corresponding internal portions starting from corresponding opposite longitudinal ends of the spiral-like winding for corresponding longitudinal extensions that are not superimposed.

4. The apparatus for purifying a fluid according to claim 2, wherein the collectors are embedded within the tubular body in a liquid-proofing resin.

5. The apparatus for purifying a fluid according to claim 4, wherein the internal portions of the collectors are electrically connected to the first internal sides of the electrode layers for at least corresponding facing sections.

6. The apparatus for purifying a fluid according to claim 5, the apparatus comprising a tubular body which is arranged coaxial with the longitudinal extension axis and contains the collectors at the interior of the tubular body itself, wherein the tubular body is provided with two longitudinal grooves, through which the internal portions of the collectors are electrically connected to the facing sections of the first internal sides of the electrode layers.

7. The apparatus for purifying a fluid according to claim 1, the apparatus comprising a feed duct for feeding the fluid to be treated and an extraction duct for extracting treated fluid,
wherein the containment structure is provided with an internal surface and is closed at its longitudinal ends by a first end cover and a second end cover respectively connected to the feed duct and to the extraction duct,
the apparatus comprising seal elements arranged between the spiral-like winding and the internal surface of the containment structure at longitudinal ends of the spiral-like winding.

8. The apparatus for treating a fluid according to claim 1, the apparatus comprising a plurality of the pairs of the electrode layers with the spacer layers interposed, the electrode layers of each pair being electrically connected to the collectors with corresponding polarity.

9. The apparatus for purifying a fluid according to claim 1, wherein each electrode layer of the at least one pair of electrode layers comprises:

at least one metallic conduction layer electrically connected to the power supply and provided with at least one first contact surface;

at least one first graphite layer provided with at least one first wet surface directed towards the spacer layer interposed between the pair of electrode layers, and with a first dry surface configured to be compressed by hydraulic pressure exerted by the fluid, directly in adherence against the first contact surface of the metallic conduction layer, in order to distribute the current of the power supply from the first metallic conduction layer to the first graphite layer.

10. The apparatus for purifying a fluid according to claim 1, wherein the internal portions of the collectors are connected to the corresponding electrode layers only at the corresponding first internal sides of the electrode layers.

11. The apparatus for purifying a fluid according to claim 1, wherein the internal portion of each collector has rod-like shape.

12. The apparatus for purifying a fluid according to claim 1, wherein the internal portion of each collector is axially aligned with the longitudinal extension axis.

13. The apparatus for purifying a fluid according to claim 1, wherein the containment structure is cylindrical.

14. A method for producing an apparatus for purifying a fluid according to claim 1, the method comprising:
providing a containment structure;
providing at least one pair of electrode layers facing each other and provided with corresponding first internal sides;
providing two or more electrically isolating spacer layers provided with corresponding second internal sides;
interposing the isolating spacer layers between the electrode layers;
providing an electric power supply comprising at least one pair of collectors for electric connection with different polarity, each of the collectors being extended with a corresponding internal portion and being extended with an external portion, the internal portion of each collector being longitudinally extended with elongated shape;
electrically connecting the internal portions of the collectors to the respective electrode layers at the first longitudinal internal side of the electrode layers;
isolating the collectors in order to liquid-proof the collectors with respect to fluid;
winding the at least one pair of electrode layers and the spacer layers around the internal portions of the collectors with spiral-like winding starting from the first longitudinal internal sides of the electrode layers and starting from the second longitudinal internal sides of the spacer layers; and
inserting the spiral-like winding within the containment structure, wherein the internal portions of the collectors are positioned parallel to a longitudinal extension axis.

15. The method according to claim 14, wherein isolating the collectors comprises:
providing a tubular body provided with two longitudinal grooves;
introducing the internal portions of the collectors within the tubular body with the internal portion of the collector of each polarity introduced starting from a corresponding longitudinal internal end of the tubular body and with the connection to the first longitudinal internal sides of the electrode layers arranged through the longitudinal grooves of the tubular body; and introducing a liquid-proofing resin within the tubular body.

16. The method according to claim 14, wherein, in the connecting the internal portions of the collectors to the respective electrode layers, the internal portions of the collectors are connected to the respective electrode layers only at the first internal side of the electrode layers.

\* \* \* \* \*

UNITED STATES PATENT AND TRADEMARK OFFICE
CERTIFICATE OF CORRECTION

PATENT NO. : 9,776,894 B2  
APPLICATION NO. : 14/979591  
DATED : October 3, 2017  
INVENTOR(S) : Tullio Servida It is certified that error appears in the above-identified patent and that said Letters Patent is hereby corrected as shown below:

In the Claims

Claim 5, Column 11 Line 36:  
Change:  
--claim 4--  
To:  
"claim 3"

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*